(12) United States Patent
Van De Walker

(10) Patent No.: US 6,378,956 B1
(45) Date of Patent: Apr. 30, 2002

(54) WHEEL CHOCK ASSEMBLY

(76) Inventor: Larry G. Van De Walker, 401 Second St. SW., Stewartville, MN (US) 55976

( * ) Notice: Subject to any disclaimer, the term of this patent is extended or adjusted under 35 U.S.C. 154(b) by 0 days.

(21) Appl. No.: 09/552,100

(22) Filed: Apr. 19, 2000

Related U.S. Application Data

(60) Provisional application No. 60/130,623, filed on Apr. 22, 1999.

(51) Int. Cl.⁷ .................................................. B60T 1/00
(52) U.S. Cl. ........................................ 303/4 R; 303/32
(58) Field of Search ........................... 188/32, 4 R, 36, 188/37, 38

(56) References Cited

U.S. PATENT DOCUMENTS

| | | | |
|---|---|---|---|
| 1,495,697 A | | 5/1924 | Kosarik |
| 1,898,896 A | | 2/1933 | Roihan ........................ 188/4 R |
| 2,960,191 A | | 11/1960 | Roberts .......................... 188/4 |
| 3,086,619 A | | 4/1963 | Grotz ............................ 188/4 |
| 3,176,785 A | * | 4/1965 | Lukawsky ................... 188/4 R |
| 3,176,798 A | | 4/1965 | Nesselberger .................. 188/4 |
| 3,517,776 A | * | 6/1970 | Corti et al. .................. 188/4 R |
| 4,155,523 A | | 5/1979 | Morford et al. ......... 244/103 R |
| 4,354,580 A | * | 10/1982 | Delasantos et al. .......... 188/4 R |
| 4,437,682 A | | 3/1984 | Yokoyama et al. ....... 280/764.1 |
| 4,949,817 A | | 8/1990 | Knies .......................... 188/4 R |
| 5,096,021 A | | 3/1992 | Tart ............................. 188/32 |
| 5,435,418 A | * | 7/1995 | Warren et al. ............... 188/4 R |
| 5,439,076 A | * | 8/1995 | Percy, Jr. ..................... 188/4 R |
| 5,601,158 A | | 2/1997 | Klusmeyer et al. | |
| 5,901,816 A | * | 5/1999 | Camilleri ..................... 188/4 R |

FOREIGN PATENT DOCUMENTS

IT 636222 * 3/1962 ................. 188/4 R

* cited by examiner

*Primary Examiner*—Matthew C. Graham
(74) *Attorney, Agent, or Firm*—Joseph F. Breimayer

(57) ABSTRACT

A vehicular wheel chock assembly and method of operation for use in providing automatic, positive chocking of one or more wheel of a vehicle upon setting of the vehicle's emergency/parking brakes and automatic retraction of the chock assembly upon release of the emergency/parking brakes. Retraction and extension air pressures are derived from the accessory air reservoir upon engagement and release, respectively of the vehicle's air powered parking or emergency brakes. Thus, the vehicle driver merely has to engage the emergency/parking brakes when parking the vehicle to cause the wheel chocks to be moved from their retracted positions to their engaged positions in front of and behind a vehicle wheel. In this way, the wheel chock assembly positively forces the wheel chocks into engagement with the parked vehicle wheels and the surface they rest on or positively collapses the chock assembly into a compact configuration at the underside of the vehicle on which the chock assembly is mounted. Particular wheel chocks that rotate in the retracted position and shed accumulations of ice, snow, mud and any other matter are disclosed.

18 Claims, 11 Drawing Sheets

WHEEL CHOCK ASSEMBLY

This application claims priority and benefits from Provisional Patent Application No. 60/130,623 filed Apr. 22, 1999 entitled WHEEL CHOCK ASSEMBLY.

FIELD OF THE INVENTION

The present invention relates to a vehicular wheel chock assembly and method of operation, and more particularly, to such an assembly and method for use in providing automatic, positive chocking of one or more wheel of a vehicle upon setting of the vehicle's parking brakes and automatic retraction of the chock assembly upon release of the parking brakes.

BACKGROUND OF THE INVENTION

Modem vehicles are normally supplied with emergency or parking brake systems that function to maintain the vehicle in a fixed position. Such systems usually operate on the wheels of the vehicle and are intended to prevent the wheels from rotating while the vehicle is parked and to thereby prevent the vehicle from accidentally moving.

Commercially used cargo vehicles, such as trucks or trailers of a tractor-trailer combination, are also provided with supplemental systems for preventing wheel rotation and vehicle movement. Typically, such vehicles carry wedge shaped, wheel chocks that are to be manually placed in front and/or behind a tire mounted on a wheel of the vehicle when it is parked. In many cases, the use of such tire engaging wheel chocks is mandated by government regulation or regulations of the trucking firm or its clients. For example, state and federal regulations, as well as company or trucking firm rules, require that drivers of vehicles, e.g. single axle delivery trucks, place at least one wheel chock forward and one wheel chock rearward of a drive wheel tire at every stop that the vehicle makes. Each wheel chock is hand wedged against the tire and ground or pavement surface. Although the wheel chocks contact and are wedged between the tire surface and the ground or pavement, they are customarily referred to as "wheel chocks" rather than "tire chocks".

While the consistent and correct use of such wheel chocks serves the function of preventing runaway of a vehicle, chocks are not always available when the vehicle is parked or the driver may forget to place them in position or may place them improperly. An improperly placed wheel chock may also slip or move aside if the vehicle is jarred or is on an incline. The failure to place a wheel chock or the failed function of the wheel chock can result in property damage and/or personal injury and/or the imposition of sanctions against the driver and his employer. If hazardous materials are involved, environmental damage and personal injury of others can also result.

Over the years, many attempts have been made to provide a mechanized wheel chock assembly wherein one or more wheel chock is lowered into position when the vehicle is parked and raised before the vehicle is driven away as typified by U.S. Pat. Nos. 3,086,619, 3,176,798, 3,517,776 and 4,354,580. A wheel blocking mechanism is also described in U.S. Pat. No. 5,601,158 which is used for the same purpose but engages only into the tire to prevent it from rotating and does not engage the surface the tire rests upon. Emergency braking systems are disclosed in U.S. Pat. Nos. 4,949,817, 5,435,418, 5,439,076, and 5,497,857 that deploy brake wedges similar to wheel chocks or flaps while the vehicle is moving to slow it when the regular brakes fail or otherwise cannot stop the vehicle.

To my knowledge, these systems have not been widely commercialized, and drivers still rely upon use of hand deployed wheel chocks to stabilize a parked vehicle.

SUMMARY OF THE INVENTION

The present invention has a number of aspects which may be advantageously employed separately or in combinations which in turn may be separately claimed or claimed in combination.

One aspect of the present invention provides an improved control system for deploying and retracting an improved wheel chocking apparatus that can be installed on a truck or trailer and operated by the vehicle driver sitting in the driver's seat.

Another aspect of the present invention provides a vehicle wheel chock assembly attached to a vehicle in a position to be stored in a retracted position in a compact configuration that can be deployed to force two or more wheel chocks into an engaged position in engagement between a tire of the vehicle and the surface it rests upon to prevent rotation of the tire.

Another aspect of the present invention provides various ways of utilizing the vehicle pressurized air supply to operate the wheel chock assembly between and in the retracted position and the engaged position.

Another aspect of the present invention incorporates a particular wheel chock configuration and mounting that maintains it in a relatively clean state that facilitates its deployment into the engaged position.

In one aspect of the invention, the improved control system is operable in conjunction with the setting and releasing of the vehicle's emergency or parking brakes such that two or more wheel chocks are deployed from their retracted positions to their engaged positions upon setting the brakes and are retracted from their engaged positions back to their retracted positions upon release of the brakes. Preferably, the vehicle driver only has to set or release the brakes to cause the wheel chock(s) to be deployed or retracted, respectively.

Moreover, positive forces are employed to maintain the wheel chocks in both the retracted and deployed position. In a further aspect of the invention, the positive forces are supplied by the vehicle's accessory air supply.

In a particular embodiment, front or forward and rear or back wheel chocks are mounted at the free ends of articulated, front and rear, chock deployment and retraction arms, or chock arms, respectively. The fixed ends of the front and rear chock arms are coupled to respective front and rear arm axles that are mounted to the vehicle parallel with the vehicle axle and located forward and rearward of the vehicle wheel that the wheel chocks engage in the deployed or engaged position. Front and rear pivot arms are fixedly coupled at fixed pivot arm ends to the front and rear arm axles and extend to front and rear pivot arm free ends, respectively. A dual action pneumatic air cylinder having a fixed end and a movable piston rod at the other end is mounted between the front and rear pivot arm free ends and thereby extends perpendicularly to and is coupled between the front and rear arm axles. The mountings of the cylinder fixed end with the front pivot arm and the piston rod free end with the rear pivot arm free end allow the front and rear pivot arms to be pivoted about the front and rear arm axles and to thereby rotate the front and rear arm axles upon extension and retraction of the piston arm from and back into the cylinder. The mutual rotations of the front and rear arm axles in turn causes the front and rear chock arms to pivot between the engaged and retracted positions.

The dual action pneumatic air cylinder has a cylinder extension air inlet/outlet to an extension chamber on an extension side of an internally disposed piston within the cylinder coupled with the piston rod and a cylinder retraction air inlet/outlet to a retraction chamber on a retraction side of the internally disposed piston within the cylinder through which the piston rod extends to its free end. The piston rod is extended by movement of the piston in the elongated cylinder bore away from the cylinder fixed end when extension air pressure applied to the extension air inlet/outlet exceeds retraction air pressure applied to the retraction air inlet/outlet or retraction air pressure is bled from the retraction air inlet/outlet. Similarly, the piston rod is retracted by movement of the piston in the elongated cylinder bore away toward the cylinder fixed end when retraction air pressure applied to the retraction air inlet/outlet exceeds extension air pressure applied to the extension air inlet/outlet or extension air pressure is bled from the extension air inlet/outlet.

In accordance with a further aspect of a first embodiment of the present invention, the retraction and extension air pressures are derived from the vehicle accessory air supply. In preferred embodiments of the invention, the air pressure is supplied by an air reservoir tank that supplies air to the extension air inlet/outlet upon engagement of the emergency/parking brake and to the retraction air inlet/outlet upon release, respectively, of the vehicle's air powered parking or emergency brakes.

Thus, the vehicle driver merely has to engage the emergency/parking brake when parking the vehicle to cause the wheel chocks to be moved from their retracted positions to their engaged positions in front of and behind a vehicle wheel. The wheel chock assembly positively forces the wheel chocks into engagement with the parked vehicle wheels and the surface they rest on or positively collapses the chock assembly into a compact, retracted, stored configuration.

Advantageously, the movement between the retracted and engaged positions is at a relatively slow rate to avoid accidental injury to technicians engaged in service or repairs. Moreover, if the driver engages the emergency brake while the vehicle is moving, the delayed deployment from the retracted position to the engaged position allows the wheel brakes to be engaged and locked up during the delay. Then, the wheel chocks will contact a stopped wheel, and at least the forward wheel chock will be frictionally engaged with the ground surface to assist in stopping the vehicle or trailer.

Furthermore, the wheel chocks are mounted and configured to shed any accumulation of material that would interfere with their safe deployment while in the retracted position. Specifically, the wheel chocks are cylindrical and mounted to the free end of the chock arms to rotate about an axis parallel with the wheel axis while in the retracted position so that any accumulation of mud, dirt, snow, road slush or ice or other material upon is shed or tends to be dropped off, thereby keeping the wheel chock clean and able to be deployed into the engaged position when needed.

The foregoing Summary of the Invention is not intended to describe each embodiment or every implementation of the present invention. While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the spirit and scope of the invention as defined by the appended claims.

BRIEF DESCRIPTION OF THE DRAWINGS

Other advantages and features of the present invention will be readily appreciated as the same becomes better understood by reference to the following detailed description when considered in connection with the accompanying drawings (which are not necessarily to scale in all cases), in which like reference numerals designate like parts throughout the figures thereof and wherein.

DETAILED DESCRIPTION OF THE PREFERRED EMBODIMENTS OF THE INVENTION

Figure 1:
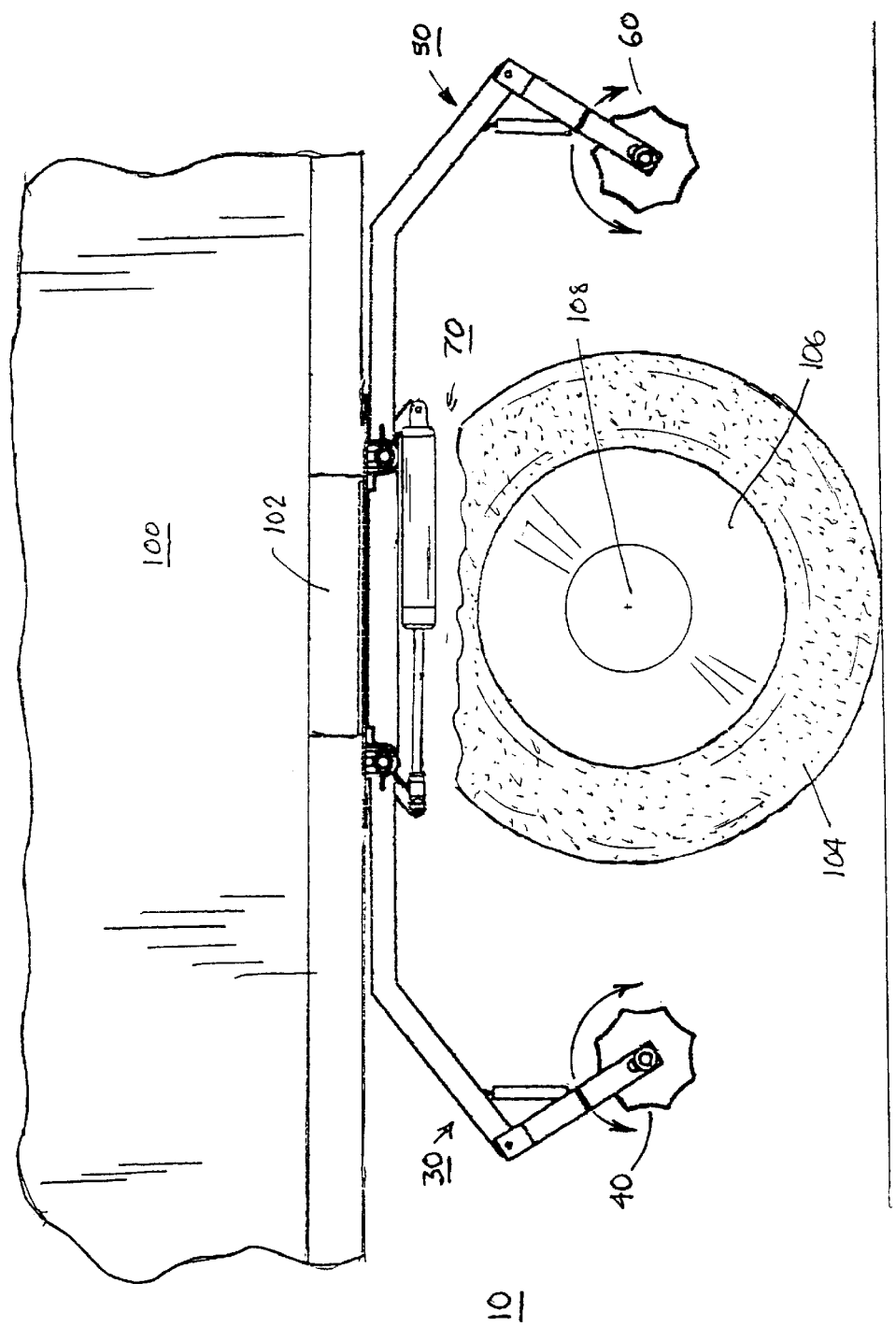
FIG. 1 is a partial side view of the wheel chock assembly of the present invention mounted to a vehicle frame with the wheel chocks in the elevated, retracted position.

The preferred embodiments of the present invention are preferably implemented on a single drive axle cargo vehicle having an air brake system, but may be employed on other vehicles including tractors and trailers adapted to be coupled in a tractor-trailer configuration. The preferred embodiments employ the mechanical structure of the wheel chock assembly depicted in FIGS. 1–5 and the air supply systems and operating modes of FIGS. 6–8 or 9–11. However, it will be understood that the air supply systems and operating modes of FIGS. 6–8 or 9–11 may be used with wheel chock assemblies that differ in one or more respect from the preferred assembly depicted in FIGS. 1–5; for example, the particular configuration of the wheel chock of the wheel chock assembly can take a variety of forms other than the preferred form depicted in the drawings and described below and the so modified wheel chock assembly may advantageously be employed with one or the other of the air supply systems.

In such vehicles, the air supply to the emergency or parking brakes is operated such that the emergency/parking brakes are maintained dis-engaged during driving by application of a predetermined air pressure, e.g., a 120 psi air pressure, from an air supply through an emergency/parking brake valve that can be closed or opened by the driver in the vehicle cab or driver's seat. The 120 psi air pressure is supplied when the emergency/parking brake valve is open (brake not engaged) to the right and left air brake manifolds at the right and left vehicle drive wheels. The 120 psi air pressure overcomes the brake springs and maintains the brake surfaces out of engagement with the brake drums or rotors rotated by the rotation of the vehicle axle as the vehicle is driven. When the brake is engaged by the driver, the air line supplying the 120 psi air pressure is closed reducing the air pressure to 0 psi above atmospheric pressure, allowing the brake springs to move the brake surfaces into engagement with the brake drums or rotors. Similarly, the brakes are engaged if the air pressure in the brake lines dissipates to atmospheric pressure due to a failure of an air system component. In either instance, the reduction in brake line air pressure is employed in accordance with the present invention, to control the deployment of the wheel chocks into the engaged position.

Figure 6:
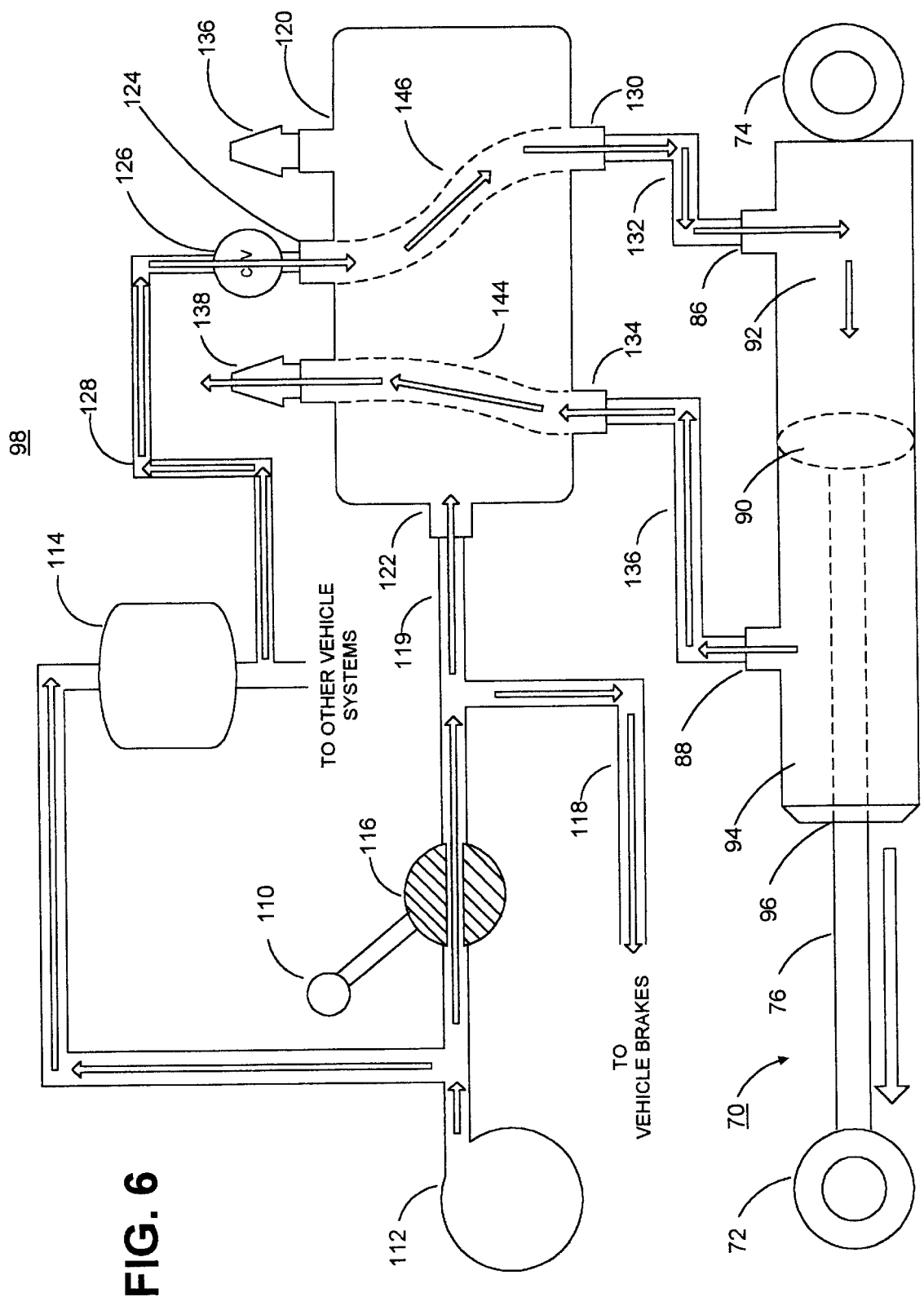
FIG. 6 is a schematic view of a first preferred embodiment of the air operating system for moving and retaining the wheel chock assembly with the wheel chocks in the retracted position of FIG. 1.
Figure 7:
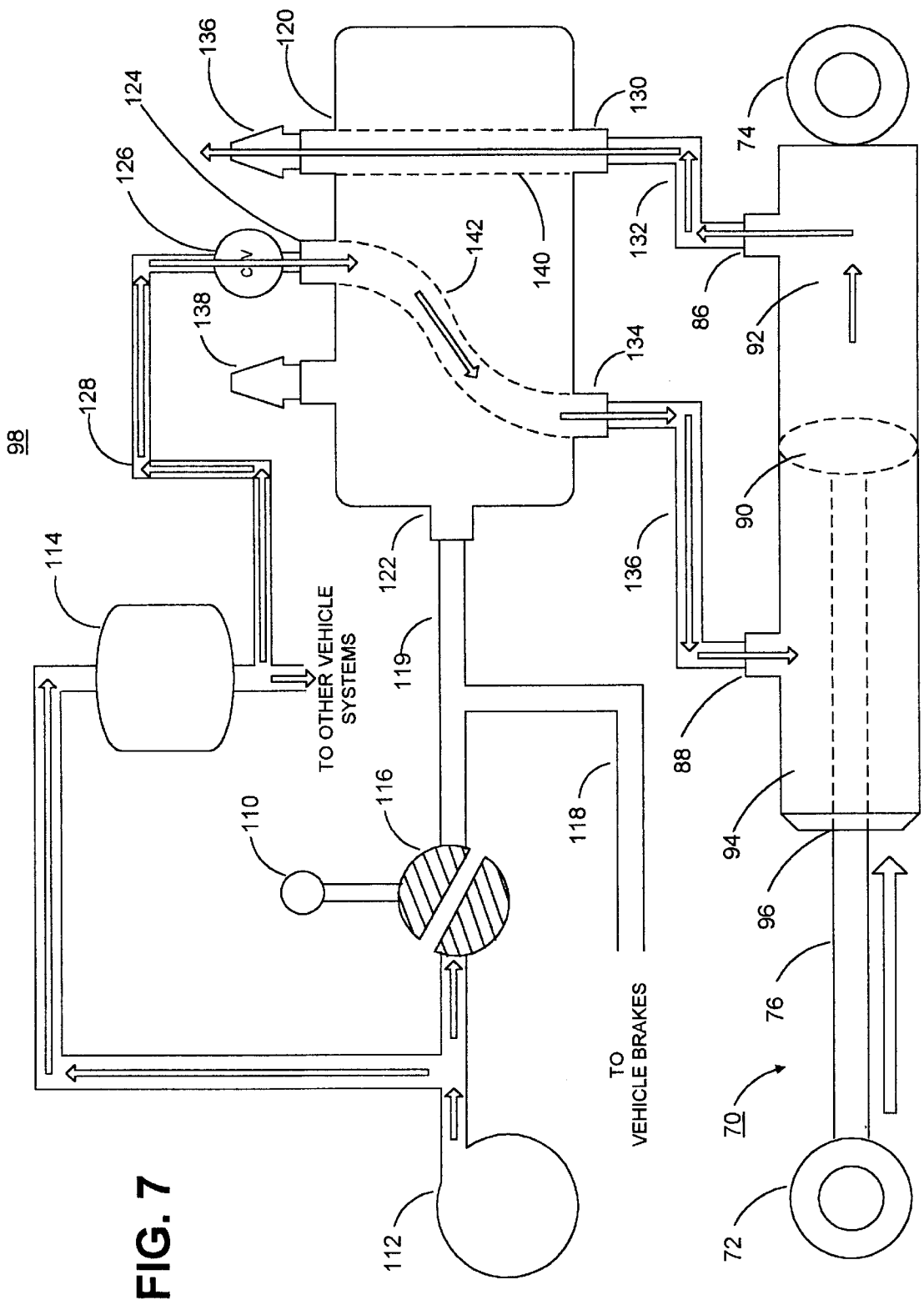
FIG. 7 is a schematic view of a first preferred embodiment of the air operating system for moving and retaining the wheel chock assembly with the wheel chocks in the engaged position of FIG. 2.
Figure 8:
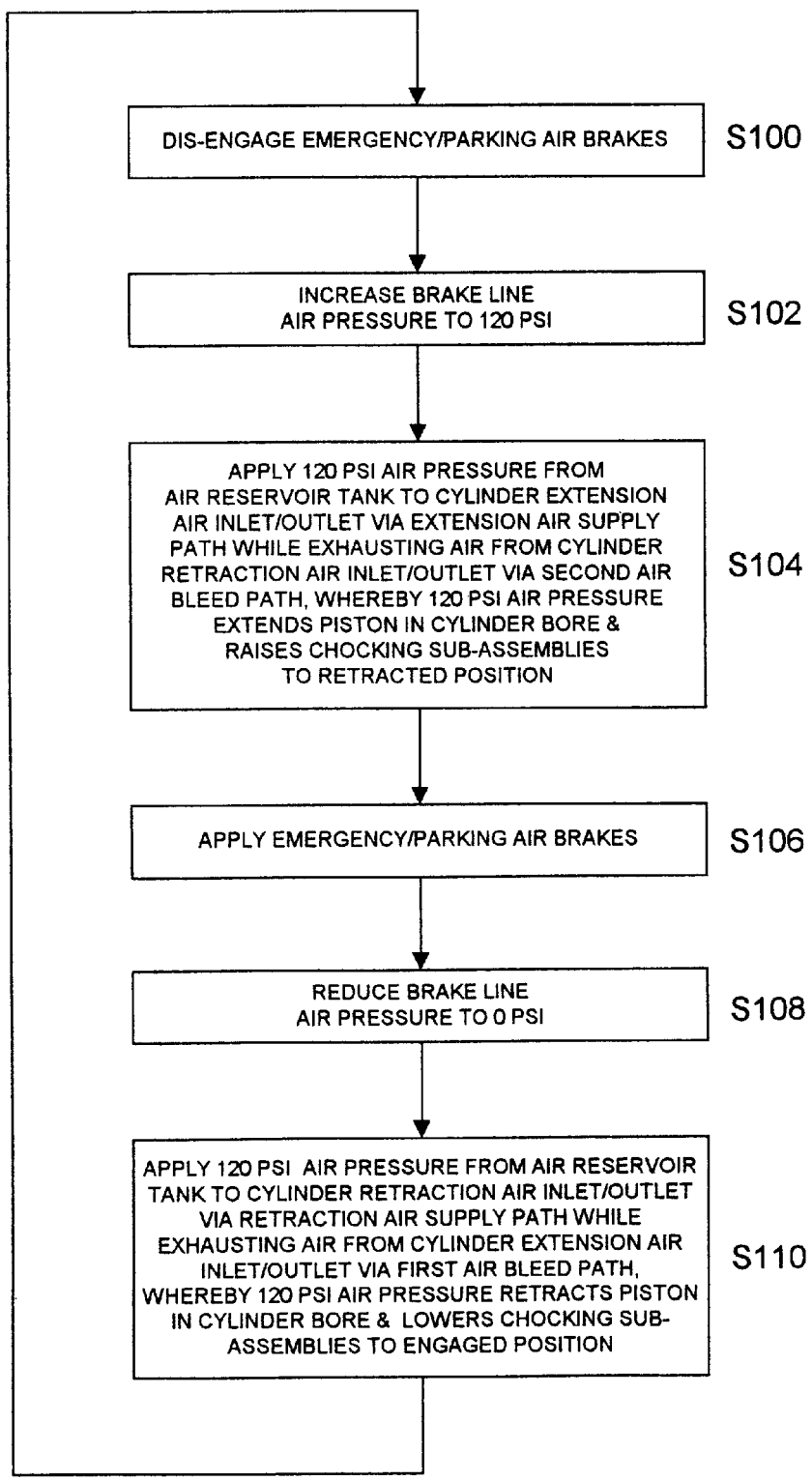
FIG. 8 is a flowchart illustrating the operation of the first preferred embodiment of the chock assembly of the present invention.
Figure 9:
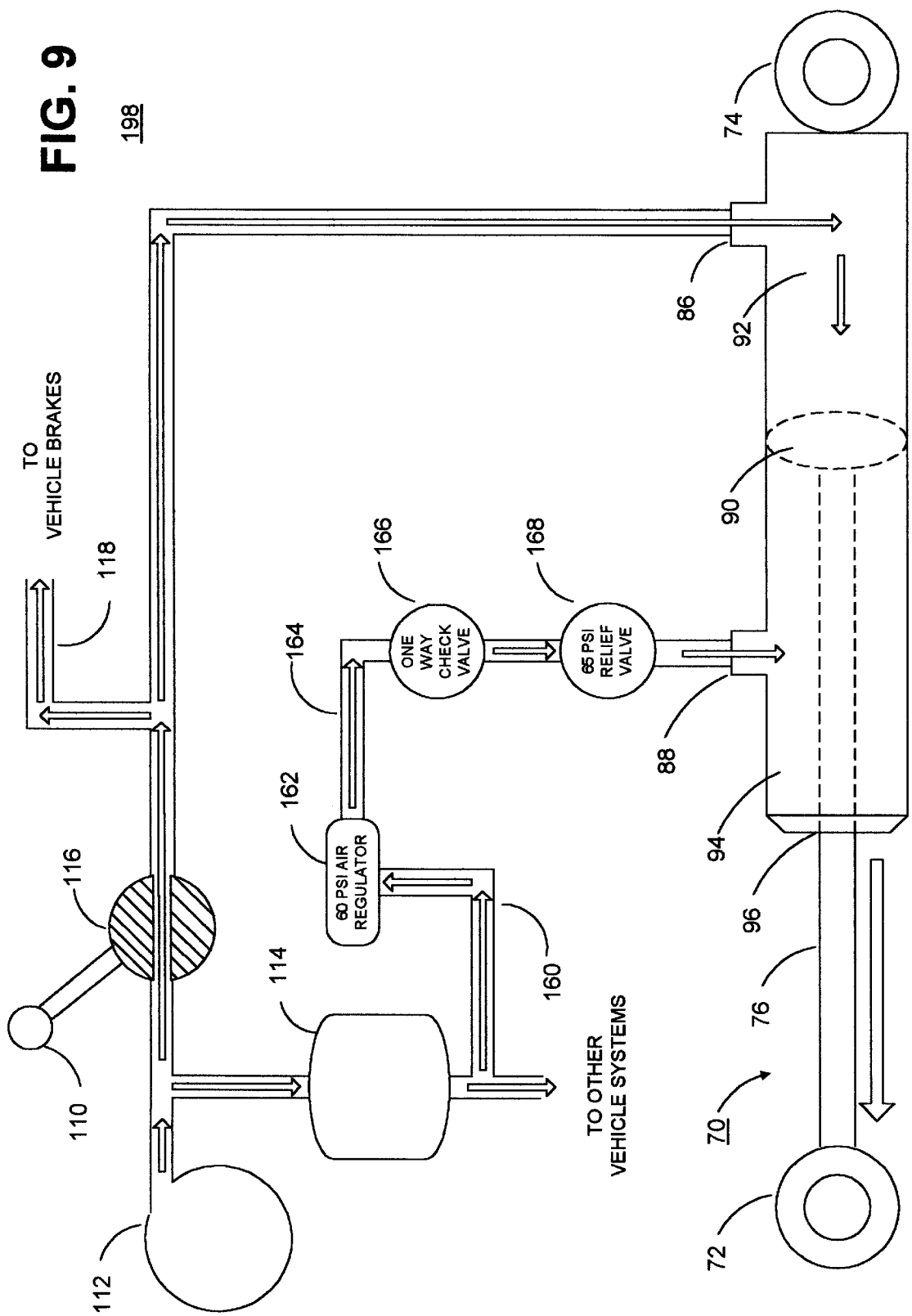
FIG. 9 is a schematic view of a second preferred embodiment of the air operating system for moving and retaining the wheel chock assembly with the wheel chocks in the retracted position of FIG. 1.
Figure 10:
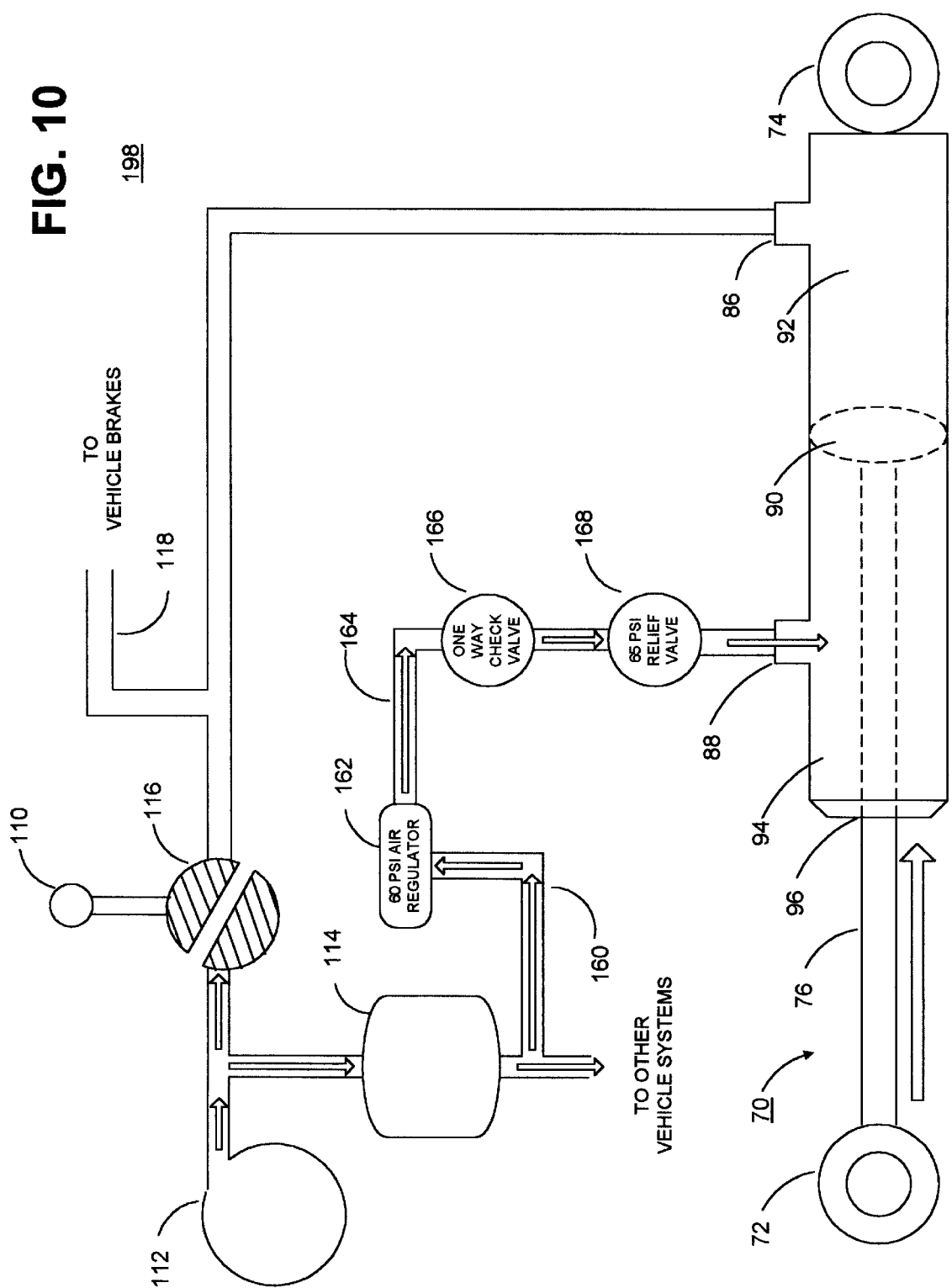
FIG. 10 is a schematic view of a second preferred embodiment of the air operating system for moving and retaining the wheel chock assembly with the wheel chocks in the engaged position of FIG. 2.
Figure 11:
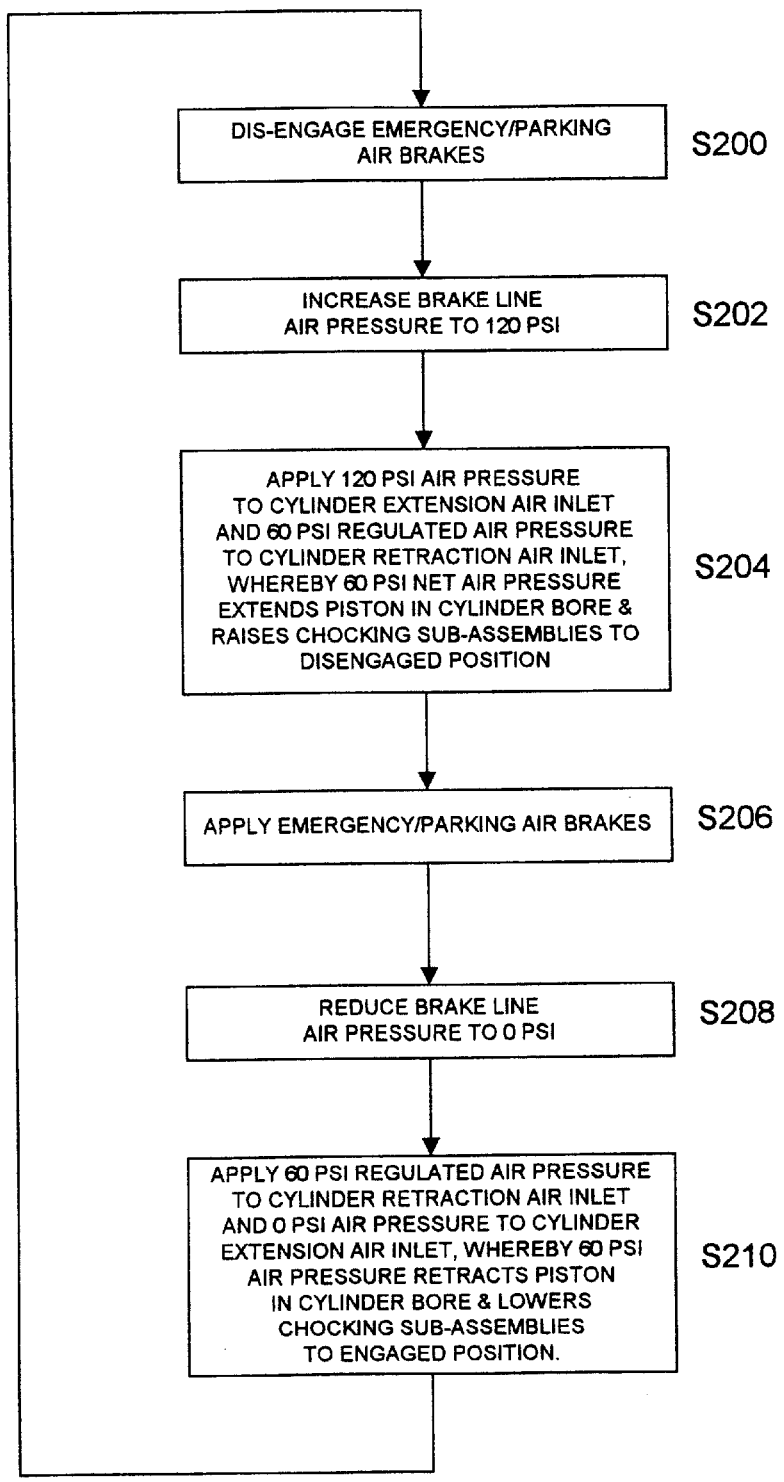
FIG. 11 is a flowchart illustrating the operation of the second preferred embodiment of the chock assembly of the present invention.

Reference is first made to the mechanical components of the wheel chock assembly 10 depicted in FIGS. 1–5 that is mounted to components of the body or frame 102 of a vehicle 100 and coupled with the vehicle air supply, modified and employed as shown in the first embodiment of FIGS. 6–8 or the second embodiment of FIGS. 9–11. It will be understood that a wheel chock assembly 10 may be typically mounted to both sides of the vehicle 100 to engage at least two vehicle tires 104 mounted to wheel rims 106 attached to the same vehicle axle 108.

FIGS. 1–5 show an exemplary frame mount platform for the wheel chock assembly that is adapted to be mounted to the vehicle body and/or frame 102 comprising an elongated inboard frame mounting plate angle iron 12, front and rear outboard frame mounting pads 14 and 16, and a bridging member 18 extending between the front and rear outboard frame mounting pads 14 and 16. The mounting platform is configured to the particular vehicle frame 102 so that the inboard frame mounting plate or angle iron 12 mates with a fore-aft frame member of the vehicle and the front and rear outboard frame mounting pads 14 and 16 can be mounted to parts of or extensions from the vehicle frame 102 extending outwardly to the vehicle side and located in front of and behind the tire 104 mounted to wheel rim 106. The inboard frame mounting plate or angle iron 12 is bolted and/or welded to the fore-aft frame member of the vehicle 100, and the front and rear outboard frame mounting pads 14 and 16 are bolted and/or welded to those parts or extensions from the vehicle frame 102 extending outwardly to the vehicle side and located in front of and behind the tire 104. A pair of front pillow block bearings 20 and 22 are bolted and/or welded to the undersides of the front end of the elongated inboard frame mounting plate angle iron 12 and to the front outboard frame mounting pad 14. A pair of rear pillow block bearings 24 and 26 are bolted and/or welded to the undersides of the rear end of the elongated inboard frame mounting plate angle iron 12 and to the rear outboard frame mounting pad 16. The fore-aft and inward-outward dimensions of the mounting platform and particular locations of the front and rear pillow block bearings depend on the particular configuration of the vehicle frame and body and the size and location of the tire 104.

The pair of front pillow block bearings 20 and 22 supports a front chock sub-assembly 30, and the pair of rear pillow block bearings 24 and 26 support a rear chock sub-assembly 50 which are substantially the same and are centered with respect to the tire 102. The front chock sub-assembly 30 comprises the front wheel chock 40 rotatably mounted at the free end of an articulated, front chock deployment and retraction arm which extends to a front chock arm axle 34 that is pivotally mounted into the front pillow block bearings 20 and 22. The articulated front chock deployment and retraction arm further comprises the front chock weldment or arm 32 that is welded at one end to the front chock arm axle 34 and the front chock yoke 36 that is attached to the other end of the front chock arm 32 through a pin 38 (which may comprise a nut and bolt) and spring 48 allowing a degree of pivotal movement of the front chock yoke with respect to the front chock arm 32. The front chock yoke 36 is somewhat U-shaped to receive the front chock 40 and front chock axle 42 and to allow rotation of the front chock 40 about the front chock axle 42. The front chock axle 42 is locked to the opposed arms of the front chock yoke 36 by a lock bolt 44 and nut 46 transversely fitted into a transverse bore at one end of the front chock axle 42.

The rear chock sub-assembly 50 comprises the rear wheel chock 60 rotatably mounted at the free end of an articulated, rear chock deployment and retraction arm which extends to a rear chock arm axle 54 that is pivotally mounted into the rear pillow block bearings 24 and 26. The articulated rear chock deployment and retraction arm further comprises the rear chock weldment or arm 52 that is welded at one end to the rear chock arm axle 54 and the rear chock yoke 56 that is attached to the other end of the rear chock arm 52 through a pin 58 and spring 68 allowing a degree of pivotal movement of the rear chock yoke with respect to the rear chock arm 52. The rear chock yoke 56 is somewhat U-shaped to receive the rear chock 60 and rear chock axle 62 and to allow rotation of the rear chock 60 about the rear chock axle 62. The rear chock axle 62 is locked to the opposed arms of the rear chock yoke 56 by a lock bolt 64 and nut 66 transversely fitted into a transverse bore at one end of the rear chock axle 62.

Figure 2:
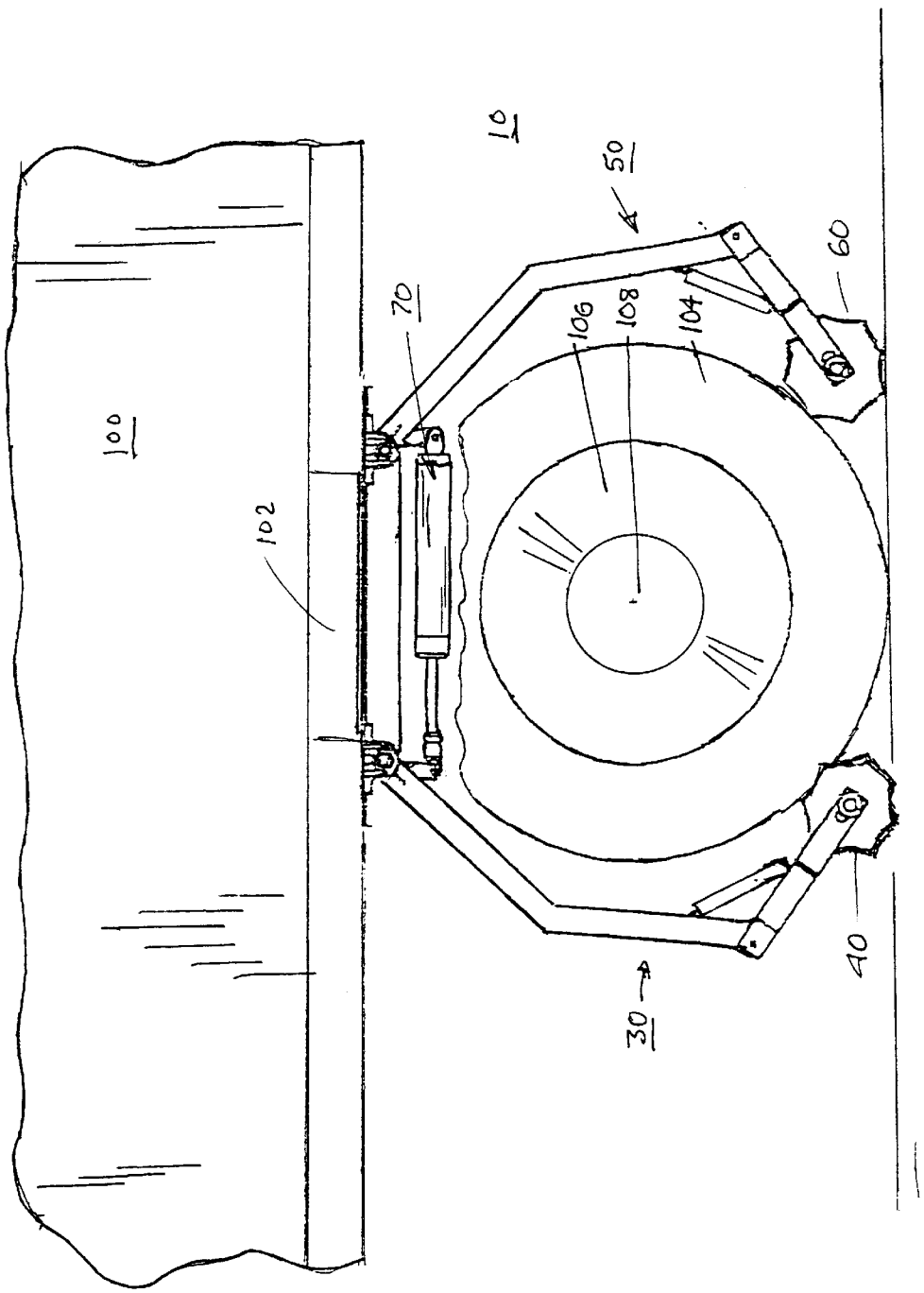
FIG. 2 is a partial side view of the wheel chock assembly of the present invention mounted to a vehicle frame with the wheel chocks in the engaged position.
Figure 3:
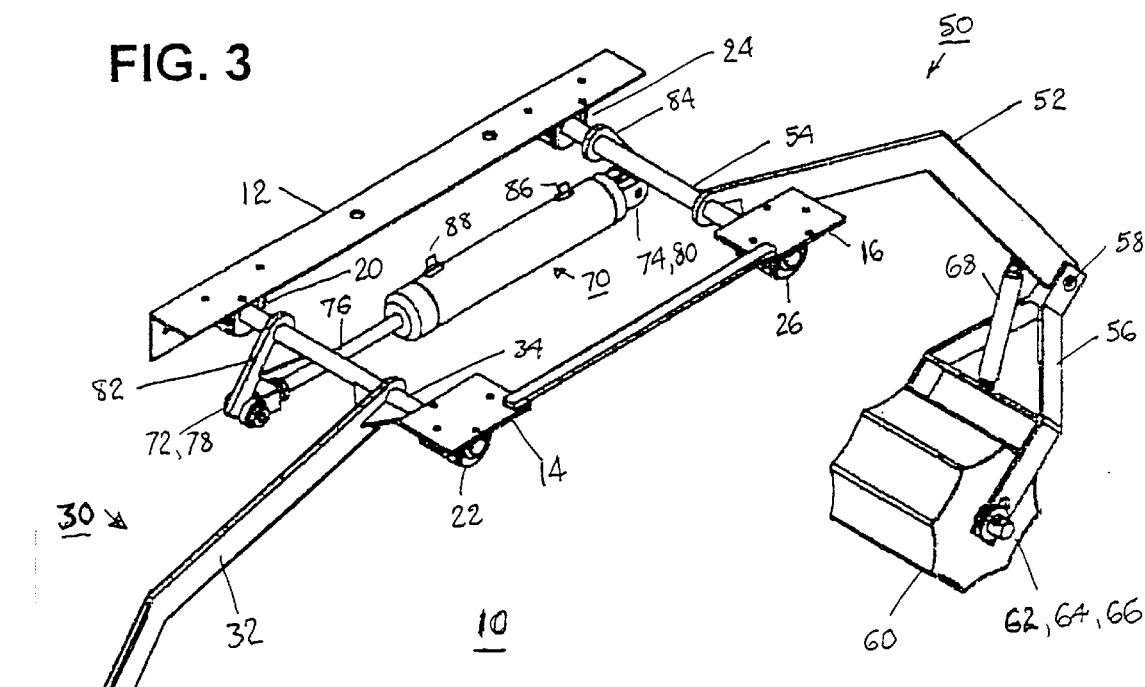
FIG. 3 is a perspective view of the wheel chock assembly.

Thus, the fixed ends of the front and rear chock arms 32 and 52 are coupled to respective front and rear arm axles 34 and 54 that are mounted to the vehicle frame parallel with the vehicle axle 108 and located forward or front and aft or rear of the vehicle tire 104 that the wheel chocks 40 and 60 engage in the deployed, engaged position of FIG. 2. The front and rear wheel chocks 40 and 60 are pivotally coupled to the free ends of the chock arms 32 and 52 through pivot axles or bearings and extension control springs 48 and 68.

Figure 12:
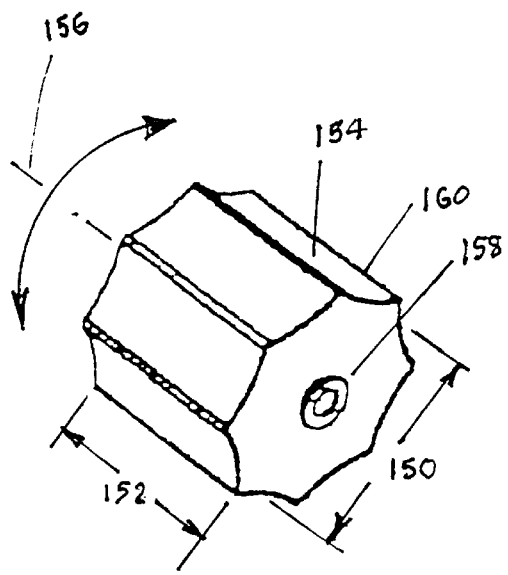
FIG. 12 is an expanded view of the preferred form of the wheel chock.
Figure 4:
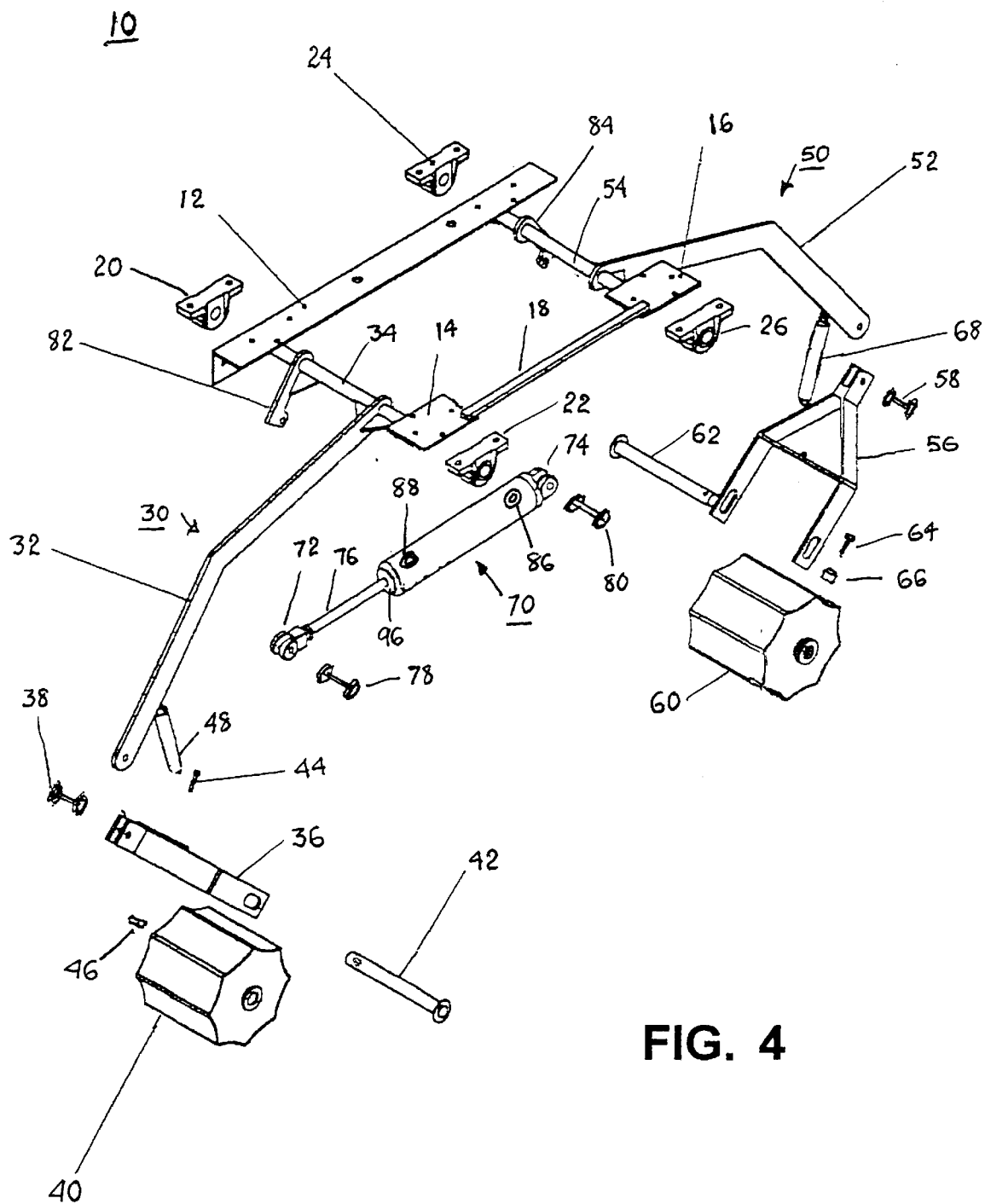
FIG. 4 is a perspective exploded view of the components of the wheel chock assembly.
Figure 5:
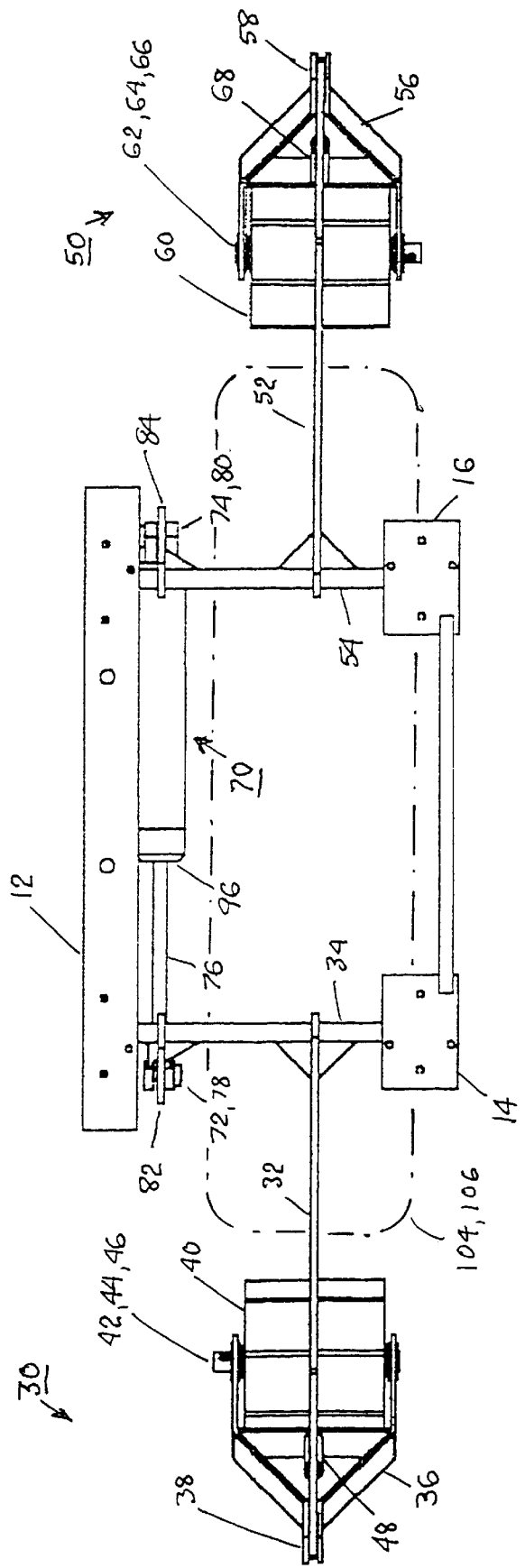
FIG. 5 is top view of the wheel chock assembly.

FIG. 12 shows the wheel chocks 40, 60 in expanded size. The relatively cylindrical wheel chocks 40, 60 are relatively cylindrical in shape, having a nominal wheel chock diameter 150 and length 152, an exterior circumference 154, and a wheel chock axis 156 extending through axial bore 158. The wheel chocks 40, 60 are capable of rotating about the chock axis 156 when the axles 42, 62 are extended through the axial bore and supported by the yokes 36, 56 as described above. The wheel chock engaging surface comprises a plurality, preferably 8, facets or flutes 154 extending along the wheel chock length 152 to provide a plurality of flattened or concave fluted surfaces between facet edges 160 for bearing against the tire 104 and the ground surface to inhibit rotation of the wheel chock 40, 60 in the engaged position of FIG. 2.

The wheel chocks 40 and 60 tend to settle in the engaged position of FIG. 2 such that facets thereof bear against the tire tread and the ground or pavement such that the wheel chocks 40, 60 cannot rotate. The facet edges 160 may indent the relatively softer tire 104 and bite into the ground or pavement. But, the wheel chocks 40 and 60 can rotate about the wheel chock axles 42 and 62, respectively, when they are raised to the elevated, retracted position of FIG. 1. Any material, e.g., dirt, mud, snow, ice or slush, that would tend to accumulate on the upper fluted surfaces of the front and rear wheel chocks 40 and 60 in the elevated retracted position is shed or dumped off because the weight of the accumulated matter on the upper surface causes the wheel chocks 40 and 60 to rotate. In this way, the wheel chocks 40 and 60 are kept clean, and no material accumulates that would interfere with deployment to the engaged position and firm contact between the wheel chock and the ground or pavement and the tire 104.

The movement of the front and rear chock sub-assemblies 30 and 50 between the retracted and engaged positions and the retention of the front and rear chock sub-assemblies 30 and 50 in the stored, retracted position illustrated in FIG. 1 and the lowered, engaged position illustrated in FIG. 2 is effected by air selectively supplied to a dual action pneumatic air cylinder 70 through one of the air operating systems depicted in FIGS. 6–11. The dual action, pneumatic air cylinder 70 has a movable end 72 mounted to the exposed end of the piston rod 76 and a relatively fixed end 74 coupled to the cylinder body end. The cylinder movable end 72 and the fixed end 74 are attached to the front and rear arm axles 34 and 54 in a manner that causes the front and rear arm axles 34 and 54 to rotate in their respective journal bearings and raise or lower the front and rear chock sub-assemblies 30 and 50.

Front and rear pivot arms 82 and 84 are attached to and extend laterally from the front and rear arm axles 34 and 54 to free ends thereof inboard of the wheel 106 and tire 104. The cylinder movable and fixed ends 72 and 74 have fittings with internal bearings that receive attachment pins 78 and 80 (which may comprise nuts and bolts), respectively, that also extend through holes in the free ends of the front and rear pivot arms 82 and 84, respectively. As depicted, the mountings of the cylinder fixed end 74 with the free end of the rear pivot arm 84 and the cylinder free end 72 with the free end of the front pivot arm 82 allow the front and rear pivot arms 82 and 84 and the front and rear arm axles 34 and 54 to be pivoted counter-clockwise and clockwise, respectively, when the piston rod 76 is retracted and drawn into the cylinder of pneumatic air cylinder 70 as shown in FIG. 2. Similarly, the mountings allow the front and rear pivot arms 82 and 84 and the front and rear arm axles 34 and 54 to be pivoted clockwise and counter-clockwise, respectively, when the piston rod 76 is extended out of the pneumatic air cylinder 70 as shown in FIG. 1. These mutual rotations of the front and rear arm axles 34 and 54 in turn cause the front and rear chock sub-assemblies 30 and 50 to pivot, in the first instance, to the engaged position depicted in FIG. 2 and, in the second instance into the elevated, retracted position depicted in FIG. 1.

Although not specifically shown, it is envisaged that a detector is provided for detecting and indicating to the driver in the cab of the vehicle when the front and rear chock sub-assemblies 30 and 50 are fully deployed into the engaged position of FIG. 2 following engagement of the emergency/parking brakes. Similarly, a further detector can be provided to indicate to the driver that the front and rear chock sub-assemblies 30 and 50 are not in the fully retracted position of FIG. 1 when the emergency/parking brakes are released. Suitable electrical switches actuated mechanically, optically, or magnetically can be operatively coupled to one or both of the front and rear chock sub-assemblies 30 and 50 to be opened or closed and provide an electrical signal to a visible display or audible alarm or the like that can be sensed by the driver.

The dual action pneumatic air cylinder 70 (also depicted schematically in FIGS. 6–7 and 9–10) may take any form, e.g., the Model SB25XII Q9318553 air cylinder manufactured by Springville Mfrg. Co., Springville, N.Y. The pneumatic air cylinder 70 has a cylinder bore enclosing an internally disposed piston 90 coupled to the internal end of the piston rod 76. The piston rod 76 extends through an air tight seal 96 and the piston 90 can be moved within the cylinder bore between a fully retracted cylinder position and a fully extended cylinder position as described above. An extension air inlet/outlet 86 leads to an extension chamber 92 of the cylindrical bore on an extension side of the piston 90, and a retraction air inlet/outlet 88 leads to a retraction chamber 94 of the cylindrical bore on a retraction side of the internally disposed piston 90. The exposed length of the piston rod 76 is increased by movement of the piston 90 in the elongated cylinder bore away from the cylinder fixed end fitting 74 when extension air pressure applied to the extension air inlet/outlet 86 exceeds retraction air pressure applied to or escaping from the retraction air inlet/outlet 88. Similarly, the exposed length of the piston rod 76 is shortened by movement of the piston 90 in the elongated cylinder bore toward the cylinder fixed end fitting 74 when retraction air pressure applied to the retraction air inlet/outlet 88 exceeds extension air pressure applied to or escaping from the extension air inlet/outlet 86.

The retraction and extension air pressures are derived from the accessory air supply of the vehicle and depend upon whether the emergency/parking brake is engaged or disengaged. In a first preferred embodiment of an air operating system 98 of the invention depicted in FIGS. 6 and 7 operated in accordance with the flow chart of FIG. 8, the retraction and extension air pressure is supplied by an air reservoir tank (also referred to as a "wet tanks") 114. The vehicle air reservoir tank 114 is pressurized to a fixed pressure by the vehicle air supply pump 112 while the vehicle engine is running, typically through a check valve (not shown) in the air line between the vehicle air supply pump 112 and the vehicle air reservoir tank 114. This air pressure is available from the vehicle air pressure tank 114 even while the vehicle engine is not running or if the vehicle air supply pump fails to function or the air line from it is broken.

A two stage control valve 120 is coupled in the air supply circuit between the two-way pneumatic air cylinder 70 and the air reservoir tank 114. The two stage control valve 120 may take the form of the model 180001-112-003 shuttle valve manufactured by Mac Valves, Inc., Wixom, Mich. The two stage control valve 120 has a control air inlet 122 coupled to a branch 119 of the air brake line 118 extending between the schematically depicted parking/emergency brake valve 116 and the vehicle distribution manifold (not shown). The vehicle air brake line 118 and branch 119 are pressurized through brake valve 116 when the schematically depicted emergency/parking brake lever (or push-button) 110 is in the disengaged position of FIG. 6. The vehicle air brake line 118 and branch 119 are de-pressurized through a bleed vent (not shown) of brake valve 116 when the emergency/parking brake lever 110 is in the engaged position of FIG. 7. The two stage control valve 120 has a spring loaded shuttle mechanism that responds to the presence of the 120 psi air pressure in the air line branch 119 by assuming the configuration depicted in FIG. 6 and responds to a reduction or the absence of air pressure in the air line branch 119 by assuming the configuration depicted in FIG. 7.

A supply air inlet 124 to the two stage control valve 120 is coupled to the air reservoir tank 114 through a check valve 126 and air line 128. A first valve inlet/outlet 130 is coupled to the extension air inlet/outlet 86 through an air line 132, and a second valve inlet/outlet 134 is coupled to the retraction air inlet/outlet 86 through an air line 132. A first calibrated air bleed valve 136 is also provided that is isolated when the two stage control valve 120 is in the configuration depicted in FIG. 6 and is coupled with the first valve inlet/outlet 130 through a first air bleed path 140 established internally when the two stage control valve 120 is in the configuration depicted in FIG. 7 A second calibrated air bleed valve 138 is also provided that is isolated when the two stage control valve 120 is in the configuration depicted in FIG. 7 and is coupled with the second valve inlet/outlet 134 through a second air bleed path 144 established internally when the two stage control valve 120 is in the configuration depicted in FIG. 6.

Steps S100–S104 set forth the operation of the air operating system 98 to control the wheel chock assembly 10 to raise to and maintain the wheel chock sub-assemblies 30 and 50 in the elevated, retracted position of FIG. 1. The 120 psi pressure is applied to the control air inlet 122 through the emergency/parking brake valve 116 in step S102 following dis-engagement of the emergency/parking brake lever 110 in step S100. In step S104, the valve configuration depicted in FIG. 6 is achieved. Air is directed from the air reservoir tank 114 through an extension air supply path 146 and into the extension chamber 92, while air in the retraction chamber 94 is bled through the second air bleed path 144. The piston 90 and piston rod 76 thus move to the left to cause the chock assembly 10 to retract or maintain the wheel chocks in the retracted position of FIG. 1. The rate of movement is controlled by the rate at which the air in retraction chamber 94 is bled through the calibrated nozzle of the air bleed valve 138. In this way, a sudden forceful movement of the front and rear chock sub-assemblies 30 and 50 is avoided to enhance safety. A retraction time on the order of 5.5 to 0.5 seconds can be attained, and a retraction time of about 1.5 seconds has been found desirable.

Similarly, steps S106–S101 illustrate the steps of the operation of the air operating system 98 to control the wheel chock assembly 10 to lower and maintain the wheel chock sub-assemblies 30 and 50 in the engage position of FIG. 2. The 120 psi pressure is removed from the control air inlet 122 through the valve 116 in step S108 following engagement of the emergency/parking brake lever 110 in step S106. In step S110, the valve configuration depicted in FIG. 7 is achieved. In the valve configuration depicted in FIG. 7, air is directed from the air reservoir tank 114 through the retraction air supply path 142 and into the retraction chamber 94, while air in the extension chamber 92 is bled through the first air bleed path 140. The piston 90 and piston rod 76 thus move to the right to cause the chock assembly 10 to extend or maintain the wheel chocks in the engaged position of FIG. 2. The rate of movement is controlled by the rate at which the air in extension chamber 92 is bled through the calibrated nozzle of the air bleed valve 136. In this way, a sudden forceful deployment movement of the front and rear chock sub-assemblies 30 and 50 is avoided to enhance safety and to ensure that the brakes are locked up in an emergency braking attempt before the chocks 40 and 60 contact the tire 104. At least the forward wheel chock 40 will be frictionally engaged with the road surface to assist in stopping the vehicle or trailer. A deployment time on the order of 0.5 to 5.5 seconds can be attained, and a deployment time of about 2.75 seconds has been found desirable.

In this way, the vehicle driver merely has to engage the emergency/parking brakes when parking the vehicle or attempting to stop the vehicle to cause the wheel chocks 40 and 60 to be moved from their retracted positions to their engaged positions in front of and behind the vehicle wheel. The wheel chock assembly 10 positively forces the wheel chocks 40 and 60 into engagement with the parked vehicle wheels and the surface they rest on or positively collapses the chock assembly into a compact configuration at the underside of the vehicle 100 on which the chock assembly 10 is mounted.

A further embodiment of an air supply and operating system 198 is illustrated in FIGS. 9 and 10 that operates in accordance with the method illustrated in FIG. 11. In this embodiment of the present invention, the 120 psi air pressure supply is used to selectively supply 120 psi or 0 psi air pressure to the cylinder extension air inlet/outlet 86 when the emergency/parking brakes are not engaged or engaged, respectively, through air line 170. In addition, the 120 psi air supply of the vehicle pressurized air reservoir tank 114 is used to supply 60 psi retraction air pressure to the retraction chamber 94. The 120 psi air pressure of the vehicle pressurized air reservoir tank 114 is provided through air line 160 to a 60 psi air regulator 162, and the 60 psi air output by regulator 162 is supplied through air line 164, one way check valve 166 and 65 psi relief valve 168 to the cylinder retraction air inlet/outlet 88.

The overall length of the cylinder between the piston rod free end 72 and the cylinder fixed end 74 is extended when the 120 psi air brake pressure is applied to the cylinder extension air inlet/outlet 86 and 60 psi is applied to the cylinder retraction air inlet/outlet 88. The net 60 psi expansion positive air pressure in the extension air chamber expands it as it moves the piston 90 to the left and extends the exposed length of the air cylinder rod 76. This net 60 psi positive force is sufficient to raise the weight of the front and rear wheel chock sub-assemblies 30 and 50 into the elevated, retracted position of FIG. 1. This operation in response to the disengagement or non-engagement of the emergency/parking brake lever 110 is illustrated in the first three steps S200–S204 of FIG. 11.

But, if the emergency/parking brakes are applied, then the air pressure applied to the extension chamber 92 is reduced to 0 psi as shown in FIG. 10 and described in steps S206–S210 of FIG. 11. In this case, the net 60 psi retraction positive air pressure in the retraction chamber 94 moves the piston 90 and rod 76 and shortens the overall length of the pneumatic air cylinder 70. This positive force is sufficient to lower the front and rear chock sub-assemblies 30 and 50 and force the front and rear wheel chocks 40 and 60 into tight engagement with the front and rear wheel surfaces and the roadway or other surface the tire 104 is resting on as depicted in FIG. 2.

Because of this application of air pressures to the expansion and retraction chambers 92 and 94, it will be realized that a total failure of the 120 psi air supply or just the air supply to the brake manifolds causes the chock arms to drop under the force of gravity or the force of the 60 psi positive air pressure applied to the retraction chamber 94. Thus, in either case, the wheel chocks 40 and 60 are brought to the engaged position of FIG. 2 after the prescribed delay while the 120 psi air pressure in the extension air chamber bleeds away. This may be of braking assistance in slowing the rotation of the wheel should the emergency/parking brakes be applied in an emergency situation while the vehicle is moving or air pressure is lost at any time.

The embodiments of the present invention are illustrated with and preferably employ both front and rear wheel chock sub-assemblies in the wheel chock assembly. However, it will be understood that certain aspects of the invention can be employed in a further embodiment having only a single wheel chock and wheel chock arm. In this alternative embodiment, one of the fixed cylinder end and the piston arm end are fixedly attached to the mounting platform or vehicle frame while the other end is attached to the wheel chock arm to cause it to pivot between the retracted and engaged wheel chock positions upon extension and retraction of the air cylinder length.

Many equivalents to the enclosed embodiments may be envisaged. For example, the various embodiments of the present invention may be implemented into equivalent wheel chock assemblies wherein the pneumatic air cylinder 70 and the linkages with the front and rear wheel chock sub-assemblies 30 and 50 are such that the front and rear wheel chock sub-assemblies 30 and 50 move into or are maintained in the retracted and engaged wheel chock positions upon retraction and extension of the air cylinder length.

While the use of 120 psi air pressure expansion force and/or the regulated 60 psi retraction forces are specified, they depend in part upon the air pressure supplied by the vehicle's parking or emergency system. Hence, these air pressure values can be changed to fit the specifications of a particular vehicle. Other safety components, e.g. relief valves, check valves, two way flow valves, and various isolation air valves can be included in the air delivery lines illustrated in FIGS. 6–7 and 9–10 as may be appropriate to meet imposed regulatory and safety requirements.

Preferably, the mechanical components, e.g., the two-way pneumatic air cylinder, the chock arms, the wheel chocks, the pivot arms, the chock arm axles, etc., are formed of lightweight and durable materials, e.g., stainless steel or aluminum. While not illustrated, because it forms no essential part of this invention, it should be understood that suitable interconnect systems are provided when the present invention is implemented in a trailer of a tractor trailer to assure that the trailer is properly connected to the tractor air supply.

While a certain preferred embodiment of the invention has been specifically disclosed, it should be understood that the invention is not to be limited thereto as many variations will be readily apparent to those skilled in the art and the invention is to be given its broadest possible interpretation within the terms of the following claims. While shown and described as mounted on and operating to chock a drive wheel of a cargo vehicle, the chock assembly is equally effective in chocking any wheeled vehicle where the wheel chock assembly may be mounted on the vehicle and may operate between the vehicle and a wheel.

What is claimed is:

1. A wheel chock assembly for a wheeled vehicle and at least one wheel attached to a wheel axle and supporting said vehicle with respect to a surface, the vehicle further having a vehicle pressurized air supply and means for engaging or releasing emergency/parking brakes, the wheel chock assembly comprising:

a mounting platform that mounts to the vehicle to dispose the wheel chock assembly in relation to the front and back of the wheel;

a front wheel chock sub-assembly comprising a front wheel chock and a front chock arm having a free end coupled with said front wheel chock and an attached end supported by said mounting platform for pivotal movement with respect to said vehicle and the front of said wheel;

a rear wheel chock sub-assembly comprising a rear wheel chock and a rear chock arm having a free end coupled with said rear wheel chock and an attached end supported by said mounting platform for pivotal movement with respect to said vehicle and the rear of said wheel;

a dual action pneumatic air cylinder having a fixed attachment end coupled with one of said front and rear wheel chock sub-assemblies and a movable attachment end coupled to the other of said front and rear wheel chock sub-assemblies, said air cylinder having cylinder bore, a cylinder piston within said cylinder bore and adapted for movement in an extension direction upon application of air pressure into an extension chamber of the cylinder bore and an opposed retraction direction therein upon application of air pressure to a retraction chamber of the cylinder bore, a cylinder rod attached at a first cylinder rod end to said cylinder piston and attached at a second cylinder rod end to said movable attachment end; and an air supply system coupled between the vehicle pressurized air supply and the extension and retraction chambers of the cylinder bore air that responds to the release and dis-engaged state of the emergency/parking brakes by supplying pressurized air from the vehicle pressurized air supply to the extension chamber of the cylinder bore to move and maintain said front and rear wheel chock assemblies in said retracted position and responds to the application and engaged state of the emergency/parking brakes by supplying pressurized air from the vehicle pressurized air supply to the retraction chamber of the cylinder bore to move and maintain said front and rear wheel chock assemblies in said engaged position.

2. The wheel chock assembly of claim 1, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the air supply system further comprises:

a valve responsive to the emergency/parking brake that provides an extension air supply path in an air supply line between the pressurized air reservoir tank and the extension chamber and an air bleed path from the retraction chamber to the atmosphere to thereby move the cylinder piston in the extension direction when the emergency/parking brake is released and that provides a retraction air supply path in an air supply line between the pressurized air reservoir tank and the retraction chamber and an air bleed path from the extension chamber to the atmosphere to move the cylinder piston in the retraction direction when the emergency/parking brake is engaged.

3. The wheel chock assembly of claim 1, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the vehicle emergency/parking brake comprises a brake valve that supplies vehicle air pressure from the vehicle pressurized air supply to vehicle brakes when the emergency/parking brake is released and withdraws the vehicle air pressure from the vehicle brakes when the emergency/parking brake is applied, and wherein the air supply system further comprises:

a valve that has a control inlet coupled with the vehicle pressurized air supply through the brake valve and responds to the application of vehicle pressurized air at the control inlet to assume a wheel chock retraction configuration that provides an extension air supply path in an air supply line between the pressurized air reservoir tank and the extension chamber and an air bleed path from the retraction chamber to the atmosphere to thereby move the cylinder piston in the extension direction and responds to the absence of vehicle pressurized air at the control inlet to assume a wheel chock deployment and engagement configuration that provides a retraction air supply path in an air supply line between the pressurized air reservoir tank and the retraction chamber and an air bleed path from the extension chamber to the atmosphere to move the cylinder piston in the retraction direction.

4. The wheel chock assembly of claim 1, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the air supply system further comprises:

means responsive to the emergency/parking brake for providing an extension air supply path in an air supply line between the pressurized air reservoir tank and the extension chamber and an air bleed path from the retraction chamber to the atmosphere to release air from the retraction chamber as pressurized air is delivered to the extension chamber and thereby move the cylinder piston in the extension direction when the emergency/parking brake is released and for providing a retraction air supply path in an air supply line between the pressurized air reservoir tank and the retraction chamber and an air bleed path from the extension chamber to the atmosphere to release air from the extension chamber as pressurized air is delivered to the retraction chamber and move the cylinder piston in the retraction direction when the emergency/parking brake is engaged.

5. The wheel chock assembly of claim 1, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the vehicle emergency/parking brake comprises a brake valve that supplies vehicle air pressure from the vehicle pressurized air supply to vehicle brakes when the emergency/parking brake is released and withdraws the vehicle air pressure from the vehicle brakes when the emergency/parking brake is applied, and wherein the air supply system further comprises:

means coupled to the vehicle pressurized air supply through the brake valve and responsive to the application of vehicle pressurized air at the control inlet for assuming a wheel chock retraction configuration that provides an extension air supply path in an air supply line between the pressurized air reservoir tank and the extension chamber and an air bleed path from the retraction chamber to the atmosphere to thereby move the cylinder piston in the extension direction and responsive to the absence of vehicle pressurized air at the control inlet for assuming a wheel chock deployment and engagement configuration that provides a retraction air supply path in an air supply line between the pressurized air reservoir tank and the retraction chamber and an air bleed path from the extension chamber to the atmosphere to move the cylinder piston in the retraction direction.

6. The wheel chock assembly of claim 1, wherein the pressurized air supply of the vehicle comprises vehicle an air pump that provides a vehicle air pressure and a pressurized air reservoir tank that is pressurized by the air pump operated while the vehicle engine is running and maintains pressurized air when the air pump is not operating or supplying pressurized air, and the vehicle emergency/parking brake comprises a brake valve that is open and supplies vehicle air pressure from the vehicle pressurized air supply to vehicle brakes when the emergency/parking brake is released and is closed and withdraws the vehicle air pressure from the vehicle brakes when the emergency/parking brake is applied, and wherein the air supply system further comprises:

an extension air line from the brake valve to the extension chamber to supply vehicle pressurized air at the vehicle air pressure to the extension chamber when the brake valve is open; and a retraction air line from the air reservoir tank to the retraction chamber, the retraction air line having a regulated pressure valve therein for supplying a regulated air pressure that is lower than the vehicle air pressure to the retraction chamber when the brake valve is both open and closed, whereby the vehicle air pressure supplied from the vehicle air pump to the extension chamber of the cylinder bore, when the brake valve is open, moves and maintains said front and rear wheel chock assemblies in said retracted position and the regulated air pressure supplied from the air reservoir tank moves and maintains said front and rear wheel chock assemblies in said engaged position when the brake valve is closed upon engagement of the emergency/parking brakes.

7. The wheel chock assembly of claim 1, wherein the pressurized air supply of the vehicle comprises vehicle an air pump that provides a vehicle air pressure and a pressurized air reservoir tank that is pressurized by the air pump operated while the vehicle engine is running and maintains pressurized air when the air pump is not operating or supplying pressurized air, and the vehicle emergency/parking brake comprises a brake valve that is open and supplies vehicle air pressure from the vehicle pressurized air supply to vehicle brakes when the emergency/parking brake is released and is closed and withdraws the vehicle air pressure from the vehicle brakes when the emergency/parking brake is applied, and wherein the air supply system further comprises:

means for supplying vehicle pressurized air at the vehicle air pressure to the extension chamber when the brake valve is open;

means for supplying a regulated air pressure that is lower than the vehicle air pressure to the retraction chamber when the brake valve is both open and closed, whereby the vehicle air pressure supplied from the vehicle air pump to the extension chamber of the cylinder bore, when the brake valve is open, moves and maintains said front and rear wheel chock assemblies in said retracted position and the regulated air pressure supplied from the air reservoir tank moves and maintains said front and rear wheel chock assemblies in said engaged position when the brake valve is closed upon engagement of the emergency/parking brakes.

8. The wheel chock assembly of claim 1, wherein said air supply system further comprise means for regulating the rate at which air is released from the extension and retraction chambers to control the rate of movement of the cylinder piston in the cylinder bore and the corresponding movement of the front and rear wheel chock sub-assemblies between the retracted and engaged positions.

9. The wheel chock assembly of claim 1, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the air supply system further comprise:

means for supplying the pressurized air from the pressurized air reservoir to the extension chamber while releasing air from the retraction chamber at a regulated rate to control the rate of movement of the cylinder piston in the cylinder bore and the corresponding movement of the front and rear wheel chock sub-assemblies from the engaged position to the retracted position; and means for supplying the pressurized air from the pressurized air reservoir to the retraction chamber while releasing air from the extension chamber at a regulated rate to control the rate of movement of the cylinder piston in the cylinder bore and the corresponding movement of the front and rear wheel chock sub-assemblies from the retracted position to the engaged position.

10. The wheel chock assembly of claim 1, wherein:

each said wheel chock is relatively cylindrical in shape, having a wheel chock diameter and length, an exterior engaging surface, and a wheel chock axis about which said wheel chock is capable of rotating; and each said chock arm further comprises a wheel chock axle extending through said wheel chock axis and a yoke supporting the wheel chock axle to enable rotation of said wheel chock about said wheel chock axis.

11. The wheel chock assembly of claim 10, wherein said wheel chock engaging surface is fluted along the wheel chock length to provide a plurality of relatively flat fluted surfaces for bearing against the wheel and the ground surface to inhibit rotation of the wheel chock in the engaged position.

12. A wheel chock assembly for a wheeled vehicle having at least one wheel attached to a wheel axle, the vehicle further having an air brake assembly coupled to a vehicle pressurized air supply for engaging or releasing emergency/parking brakes, the wheel chock assembly comprising:

a wheel chock sub-assembly comprising a wheel chock and a chock arm having a free end coupled with said wheel chock and an attached end attached for support and pivotal movement with respect to said vehicle;

means coupled to said wheel chock sub-assembly for moving said chock arm about said attached end between a retracted position locating said wheel chock in a retracted position elevated above the surface when said emergency/parking brakes are released and an engaged position locating said wheel chock in an engaged position against the vehicle wheel when said emergency/parking brakes are released; and means for coupling said wheel chock to said chock arm free end to enable shedding of accumulated material from the wheel chock when said wheel chock is in said retracted position.

13. The wheel chock assembly of claim 12, wherein:

said wheel chock is relatively cylindrical in shape, having a wheel chock diameter and length, an exterior engaging surface, and a wheel chock axis about which said wheel chock is capable of rotating; and said coupling means further comprises a wheel chock axle extending through said wheel chock axis and a yoke supporting the wheel chock axle to enable rotation of said wheel chock about said wheel chock axis.

14. The wheel chock assembly of claim 13, wherein said wheel chock engaging surface is fluted along the wheel chock length to provide a plurality of relatively flat fluted surfaces for bearing against the wheel and the ground surface to inhibit rotation of the wheel chock in the engaged position.

15. A method of operating a wheel chock assembly for a wheeled vehicle having at least one wheel attached to a wheel axle and supporting said vehicle with respect to a surface, the vehicle further having a vehicle pressurized air supply and means for engaging or releasing emergency/parking brakes, the method comprising the steps of:

providing a mounting platform that mounts to the vehicle to dispose the wheel chock assembly in relation to the front and back of the wheel;

mounting a front wheel chock sub-assembly comprising a front wheel chock and a front chock arm having a free end coupled with said front wheel chock and an attached end such that said attached end is supported by said mounting platform for pivotal movement with respect to said vehicle and the front of said wheel;

mounting a rear wheel chock sub-assembly comprising a rear wheel chock and a rear chock arm having a free end coupled with said rear wheel chock and an attached end such that said attached end is supported by said mounting platform for pivotal movement with respect to said vehicle and the rear of said wheel;

coupling a fixed attachment end of a dual action pneumatic air cylinder coupled to one of said front and rear wheel chock sub-assemblies and a movable attachment end of said dual action pneumatic air cylinder to the other of said front and rear wheel chock sub-assemblies, said air cylinder having cylinder bore, a cylinder piston within said cylinder bore and adapted for movement in an extension direction upon application of air pressure into an extension chamber of the cylinder bore and an opposed retraction direction therein upon application of air pressure to a retraction chamber of the cylinder bore, a cylinder rod attached at a first cylinder rod end to said cylinder piston and attached at a second cylinder rod end to said movable attachment end;

supplying pressurized air from the vehicle pressurized air supply to the extension chamber of the cylinder bore to move and maintain said front and rear wheel chock assemblies in said retracted position upon the release of and during the disengaged state of the emergency/parking brakes; and supplying pressurized air from the vehicle pressurized air supply to the retraction chamber of the cylinder bore to move and maintain said front and rear wheel chock assemblies in said engaged position upon the application of and continuation of the engaged state of the emergency/parking brakes.

16. The method of claim 15, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the air supply steps further comprise the steps of:

supplying the pressurized air from the pressurized air reservoir to the extension chamber while releasing air from the retraction chamber; and supplying the pressurized air from the pressurized air reservoir to the retraction chamber while releasing air from the extension chamber.

17. The method of claim 15, wherein the pressurized air supply of the vehicle comprises an air pump and a pressurized air reservoir tank that is pressurized by the air pump operated while the vehicle engine is running and maintains pressurized air when the air pump is not operating or supplying pressurized air, and the air supply steps further comprise the steps of:

supplying the pressurized air from the pressurized air reservoir to the extension chamber while releasing air from the retraction chamber at a regulated rate to control the rate of movement of the cylinder piston in the cylinder bore and the corresponding movement of the front and rear wheel chock sub-assemblies from the engaged position to the retracted position; and supplying the pressurized air from the pressurized air reservoir to the retraction chamber while releasing air from the extension chamber at a regulated rate to control the rate of movement of the cylinder piston in the cylinder bore and the corresponding movement of the front and rear wheel chock sub-assemblies from the retracted position to the engaged position.

18. The method of claim 15, wherein the pressurized air supply of the vehicle comprises vehicle an air pump that provides a vehicle air pressure and a pressurized air reservoir tank that is pressurized by the air pump operated while the vehicle engine is running and maintains pressurized air when the air pump is not operating or supplying pressurized air, and the vehicle emergency/parking brake comprises a brake valve that is open and supplies vehicle air pressure from the vehicle pressurized air supply to vehicle brakes when the emergency/parking brake is released and is closed and withdraws the vehicle air pressure from the vehicle brakes when the emergency/parking brake is applied, wherein the air supply steps further comprise the steps of:

supplying vehicle pressurized air at the vehicle air pressure to the extension chamber when the brake valve is open; and supplying a regulated air pressure from the air reservoir tank that is lower than the vehicle air pressure to the retraction chamber when the brake valve is both opened and closed, whereby the vehicle air pressure supplied from the vehicle air pump to the extension chamber of the cylinder bore, when the brake valve is open, moves and maintains said front and rear wheel chock assemblies in said retracted position and the regulated air pressure supplied from the air reservoir tank moves and maintains said front and rear wheel chock assemblies in said engaged position when the brake valve is closed upon engagement of the emergency/parking brakes.

* * * * *